United States Patent [19]

Flynn et al.

[11] 3,753,236

[45] Aug. 14, 1973

[54] MICROPROGRAMMABLE PERIPHERAL CONTROLLER

[75] Inventors: Richard Thomas Flynn; Marion Gene Porter, both of Phoenix, Ariz.

[73] Assignee: Honeywell Information Systems, Inc., Waltham, Mass.

[22] Filed: Mar. 31, 1972

[21] Appl. No.: 240,064

[52] U.S. Cl. .......... 340/172.5
[51] Int. Cl. .......... G06f 9/10
[58] Field of Search .......... 340/172.5, 146.1 BE

[56] References Cited

UNITED STATES PATENTS

| | | | |
|---|---|---|---|
| 3,629,853 | 12/1971 | Newton | 340/172.5 |
| 3,570,006 | 3/1971 | Hoff et al. | 340/172.5 |
| 3,614,747 | 1/1969 | Ishihara et al. | 340/172.5 |
| 3,562,713 | 2/1971 | Packard | 340/172.5 |
| 3,577,189 | 5/1971 | Cooke et al. | 340/172.5 |
| 3,559,183 | 1/1971 | Sussenguth | 340/172.5 |
| 3,387,278 | 6/1968 | Pasternak | 340/172.5 |
| 3,551,895 | 12/1970 | Driscoll | 340/172.5 |
| 3,430,197 | 2/1969 | Brown | 340/146.1 BE |
| 3,538,498 | 11/1970 | Games et al. | 340/146.1 BE |
| 3,474,412 | 10/1969 | Rowley | 340/146.1 BE |

*Primary Examiner*—Paul J. Henon
*Assistant Examiner*—Mark Edward Nusbaum
*Attorney*—Dudley T. Ready, Edward W. Hughes et al.

[57] ABSTRACT

A microprogrammable peripheral controller is provided in which the control store microinstruction format is compatible with the read/write memory data word format and the architecture is compatible with character oriented peripheral data formats. The controller is provided with a processor which enables word transfers in a single operation. The processor also has the capability of performing a large repertory of arithmetic and logic microinstructions, but this is made economical by limiting such operations, in general, to byte length operands. With this processing capability, the primary controller control functions can be performed economically for a wide range of perioherals. A common interface is provided for data and control information transfers between the controller and both peripheral devices and central processor ports. In general, adaptor units are required to provide compatibility between the controller and the CPU ports and peripheral interfaces, to provide data buffering, to support multiplexing and for any other special functions. The primary feature to which this disclosure is directed is processor architectural features which effectively eliminate processor execution time for performing branching operations whereby processing speed is effectively increased by a factor of more than one third for many if not all control store programs. Controller economy and reliability is further advanced by the use of dual arithmetic/logic modules which serve as redundant elements for byte operations and word transfer elements for word transfer operations.

5 Claims, 9 Drawing Figures

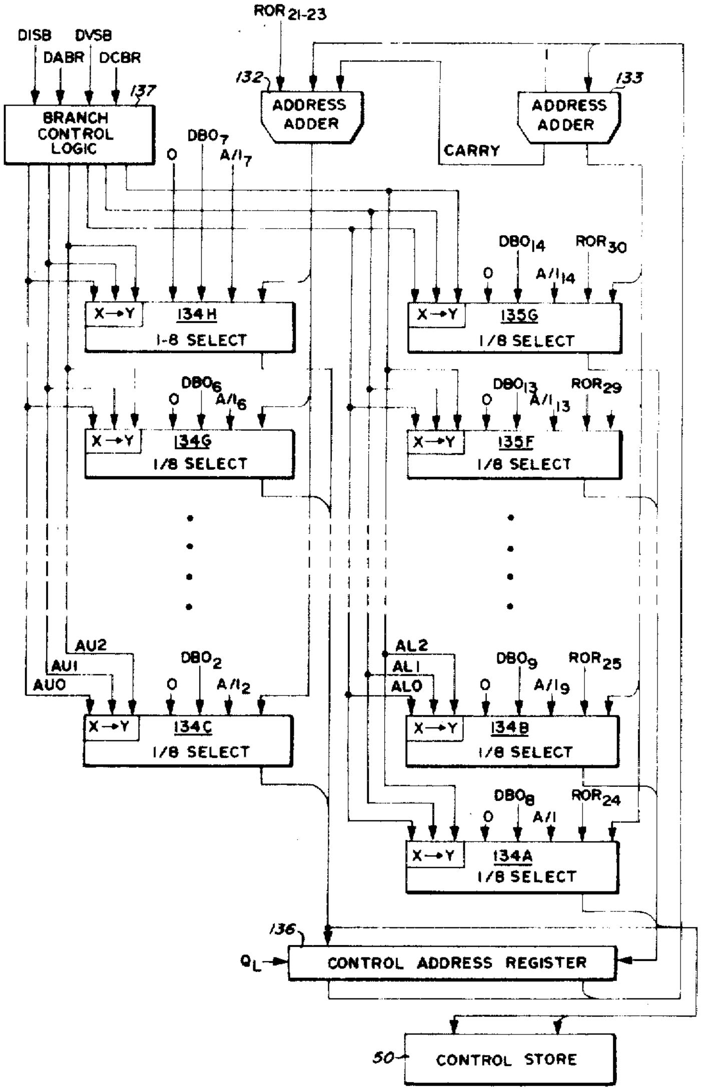
DISB
DABR
DVSB
DCBR
BRANCH CONTROL LOGIC
137
ROR 21-23
132
ADDRESS ADDER
133
ADDRESS ADDER
CARRY
0
DBO7
A/I7
X→Y
134H
1-8 SELECT
DBO14
ROR30
A/I14
135G
1/8 SELECT
DBO6
A/I6
134G
1/8 SELECT
DBO13
A/I13
ROR29
135F
1/8 SELECT
AU2
AU1
AU0
DBO2
A/I2
134C
1/8 SELECT
AL2
AL1
AL0
DBO9
A/I9
ROR25
134B
1/8 SELECT
DBO8
A/I
ROR24
134A
1/8 SELECT
136
QL
CONTROL ADDRESS REGISTER
50
CONTROL STORE Patented Aug. 14, 1973 3,753,236

8 Sheets-Sheet 1

GENERAL BASIC MICROINSTRUCTION

| 0 3 | 4 7 | 8 | 9 | 10 | 11 | 12 15 |
|---|---|---|---|---|---|---|
| 0 0 1 0 | Rn | R/ACC | B/A | BTR | U/L | OP TYPE |

SPECIAL BASIC MICROINSTRUCTION

| 0 3 | 4 7 | 8 | 9 | 10 | 11 | 12 15 |
|---|---|---|---|---|---|---|
| 0 0 1 1 | Rn | R/ACC | B/A | BTR | UP/LN | OP TYPE |

IMMEDIATE MICROINSTRUCTION, LOAD LITERAL

| 0 2 | 3 | 4 7 | 8 15 |
|---|---|---|---|
| 1 0 1 | $\overline{Rn}$/Rn | Rn /REG | LITERAL |

IMMEDIATE MICROINSTRUCTION, ARITHMETIC AND LOGICAL

| 0 3 | 4 7 | 8 | 9 | 10 | 11 | 12 15 |
|---|---|---|---|---|---|---|
| 110X / 1001 | Rn / REG. | $\overline{Rn}$/Rn | L/U | BTR | U/L | LITERAL |

DATA TRANSFER MICROINSTRUCTION, READ MEMORY

| 0 3 | 4 7 | 8 | 9 | 10 | 11 | 12 15 |
|---|---|---|---|---|---|---|
| 0 0 0 1 | Rn/0000 | $\overline{Rn}$/Rn | B/A &Rn | BTR | D/S | 0 0 0 0 |

DATA TRANSFER MICROINSTRUCTION, WRITE MEMORY

| 0 3 | 4 7 | 8 | 9 | 10 | 11 | 12 15 |
|---|---|---|---|---|---|---|
| 0 0 0 1 | Rn/0000 | ACC /Rn | S-Rn | 0 | 0 | 0 0 0 1 |

DATA TRANSFER MICROINSTRUCTION, ACC ⟷ Rn

| 0 3 | 4 7 | 8 | 9 | 10 | 11 | 12 15 |
|---|---|---|---|---|---|---|
| 0 0 0 1 | Rn | LD/ST | 0 | BTR | ROR | 0 0 1 LD/ST |

DATA TRANSFER MICROINSTRUCTION, SHIFT 1, 0 FILL, ROT, SMEAR, IR

| 0 3 | 4 7 | 8 | 9 | 10 | 11 | 12 15 |
|---|---|---|---|---|---|---|
| 0 0 0 1 | N | ACC /Rn | B/A | R/L | D/S | 1 0 X X |

DATA TRANSFER MICROINSTRUCTION, SHIFT 8

| 0 3 | 4 7 | 8 | 9 | 10 | 11 | 12 15 |
|---|---|---|---|---|---|---|
| 0 0 0 1 | N | ACC / Rn | R/L | SAVE | ROT /SH | 1 1 0 0 |

DATA TRANSFER, WORKING REGISTER

| 0 3 | 4 7 | 8 | 9 11 | 12 | | 15 |
|---|---|---|---|---|---|---|
| 0 0 0 1 | Rn | AB/Rn | 0 0 0 | 0 | 1 | REG. |

DATA TRANSFER, INTERRUPT MECHANISM

| 0 3 | 4 7 | 8 10 | 11 | 12 | | 15 |
|---|---|---|---|---|---|---|
| 0 0 0 1 | OP SUB-TYPE | 0 0 0 | R/S | 1 | 1 | OP TYPE |

FIG. 3a

CONDITIONAL BRANCH

| 16 17 | 18 | 19 | 20 21 | 22 | 23 | 24 30 | 31 |
|---|---|---|---|---|---|---|---|
| 0 1 | HOLD | TEST | BIT # | $\overline{ACC}$/ ACC | E/O | ADDRESS | U/L |

DIRECT SEGMENT BRANCH

| 16 19 | 20 | 21 30 | 31 |
|---|---|---|---|
| 0 0 0 0 | 0 | ADDRESS | SAVE |

VECTOR SEGMENT BRANCH

| 16 19 | 20 | 21 | 22 23 | 24 30 | 31 |
|---|---|---|---|---|---|
| 0 0 0 0 | 1 | 1 | REG. | ADDRESS | R/T |

ABSOLUTE BRANCH

| 16 19 | 20 21 | 22 | 23 | 24 25 | 26 30 | 31 |
|---|---|---|---|---|---|---|
| 0 0 0 0 | 1 0 | 0 | 0 | ADDR. | 0 0 0 0 0 | A |

INDIRECT SEGMENT BRANCH

| 16 19 | 20 21 | 22 | 23 | 24 30 | 31 |
|---|---|---|---|---|---|
| 0 0 0 0 | 1 0 | K/S | 1 | ADDRESS | SAVE |

NOP

| 0 3 | 4 7 | 8 15 |
|---|---|---|
| 0 0 0 0 | 0 0 0 0 | ADDRESS |

ADAPTOR SERVICE

| 0 2 | 3 | 4 | 5 | 6 7 | 8 15 |
|---|---|---|---|---|---|
| 1 1 1 | D/L | $\overline{RPI}$ | N/S | ACC | LITERAL |

MEMORY CYCLE DEFINER

| 0 3 | 4 7 | 8 9 | 10 | 11 | 12 13 | 14 15 |
|---|---|---|---|---|---|---|
| 1 0 0 0 | N | REG. | D | 0 | Z, OS | W/R |

FIG. 3b

MICROPROGRAMMABLE PERIPHERAL CONTROLLER

FIELD OF THE INVENTION

This invention relates to general purpose controllers for interconnecting peripheral devices and the central processor portions of a digital computer system. Such controllers provide appropriate interfaces for data and control signals which are compatible with peripheral devices, such as tape handlers or disk units, and for I/O ports for central processor portions of a computer system. The controller is of the type having substantial buffering and data processing capability.

DESCRIPTION OF THE PRIOR ART

A major problem in designing computer systems is the provision of efficient I/O processing. It is common for central processors to be idle a significant portion of their operating time awaiting completion of I/O operations or to allocate an inordinate amount of time for housekeeping routines for I/O operations. In general, I/O devices are character oriented, in which the characters are usually represented with six to nine bits of binary signals, and the characters are usually grouped into records which correspond, for examples, with an output line to be printed or a set of items such as payroll information for an individual. Normally, a number of records are grouped together for a given I/O operation which generally constitutes a file. On the other hand, the central processor portions of general purpose computer systems are generally word oriented, processing information on the basis of words having a representative length of 36 bits and having no inherent record or file structure. Factors of this kind tend to make efficient I/O processing demanding and difficult.

Other problems are caused by the great variations in the control requirements for the various types of peripheral devices. Very different control sequences are involved in generating printed output lines for a listing and obtaining a record from a disk unit with appropriate seek commands, etc. Furthermore, it is essential to support as high a level of error detection, hardware testing and diagnostics as possible, in order to assure error free operation and minimize down-time, which holds for all data processing equipment. For devices having a high transfer rate, such a capability is a formidable goal. Also, I/O operations, once initiated, often create real-time processing requirements for successful completion. Central processors, however, being sequential machines, are not real-time oriented. Although interrupt mechanisms and multiprogramming can enable a general purpose computer to meet most real-time requirements, data processing efficiency is often drastically reduced.

For reasons such as these, it is highly desirable to incorporate as much as possible of the system I/O control functions in the peripheral device controller, if it can be done economically. If, in addition, the controller is to have sufficient flexibility to control varied types of peripheral devices, it is obvious that it must have substantial logical and arithmetic processing capability. Furthermore, it must have sufficient speed to support data transfer rates on the order of a million bytes per second.

Accordingly, the object of the invention is to provide a controller supporting a very high rate of data processing, having sufficient logical function capability to control substantially all kinds of peripherals, having excellent reliability, while limiting the architecture to an economical minimum.

SUMMARY OF THE INVENTION

A microprogrammable peripheral controller is provided in which the control words in control store are loaded into an output register in pairs, the first of the pair being in an even location and the second being in the following adjacent (odd) location. A branch microinstruction decoder is provided for decoding a branch microinstruction in the low order portion of the output register and a primary decoder is provided for the high order portion of the output register, the latter not including any logic responsive to branch microinstructions. When a branch microinstruction is loaded into the lower order of the output register, the address preparation and fetch of the next microinstruction pair to be executed are performed in parallel with the execution of the microinstruction in the high order portion of the register. When a microinstruction other than a branch microinstruction is loaded into the low order portion of the control store output register, it is transferred to the high order portion of the register after the even microinstruction is executed. With this organization, the time for execution of branching operations is masked and the efficiency of the controller is correspondingly increased.

Further efficiency, reliability, and data processing power is obtained by supporting a microinstruction repertory which includes a broad set of microinstructions for byte and hexadecimal operands and for word transfers. This is made possible by using duplicate standard arithmetic and logical units which selectively provide redundant outputs for arithmetic and logical operations or a word transfer path. The arithmetic and logical operations are checked by comparison of the redundant units and word transfers are checked by parity.

BRIEF DESCRIPTION OF THE DRAWINGS

FIGS. 3*a* and 3*b* contain diagrams illustrating the microinstruction repertory formats of the controller processor.

DESCRIPTION OF THE PREFERRED EMBODIMENT OF THE INVENTION

Figure 1:
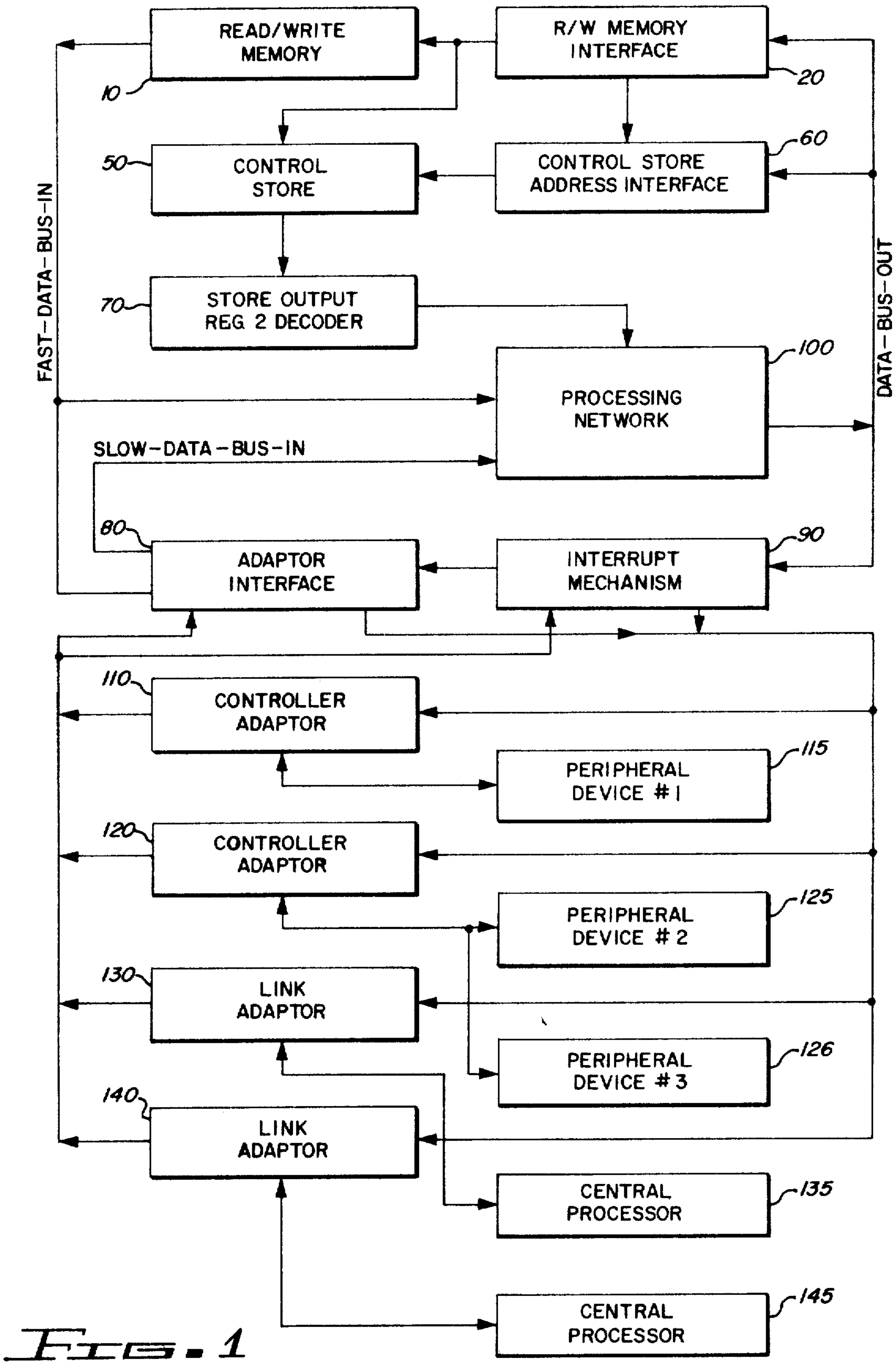
FIG. 1 is a block diagram of a representative peripheral subsystem incorporating a peripheral controller in accordance with the present invention.

FIG. 1 is a block diagram of a representative peripheral subsystem in which a set of peripheral devices 115, 125 and 126 are connected to a pair of central processor ports 135 and 145. The connections are through a microprogrammable controller which includes a processing network 100, for performing logical, arithmetic and data transfer operations; a control store 50 containing sets of microinstructions, providing programs for data transfers and peripheral device control; a control store output register (ROR) and decoder 70, which receive microinstructions; and a common adaptor interface 80. Controller adaptors 110 and 120 are provided to interconnect the common adaptor interface and the peripheral devices 115, 125 and 126. Similarly, link adaptors 130 and 140 interconnect the common adaptor interface and the central processor ports 135 and 145. The controller further includes a control store address interface 60, which includes a control store address register (ROSAR), and is connected to the data-bus-out from the processing network 100. In addition, a read/write memory 10 is generally necessary for efficient controller operation. This memory is serviced by the read/write memory interface 20, which is also connected to the processing network data-bus-out. Preferably, control store 50 has a writable portion of at least 512 microinstructions, which is also served by the memory interface 20. An interrupt mechanism 90 is responsive to signals from the adaptors, under the control of the data-bus-out signals. The operand inputs for the processing network 100 are provided by the slow and fast-data-bus-in from the adaptor interface 80 and the read/write memory 10.

The FIG. 1 peripheral subsystem is representative in that various combinations of controller adaptors and link adaptors are possible, even a stand-alone configuration with one or more controller adaptors may be useful. However, the most common configuration would be a single link adaptor and a single controller adaptor for a set of disk units or a set of tape units. Dual channel operation is enabled by a second link adaptor.

Figure 2:
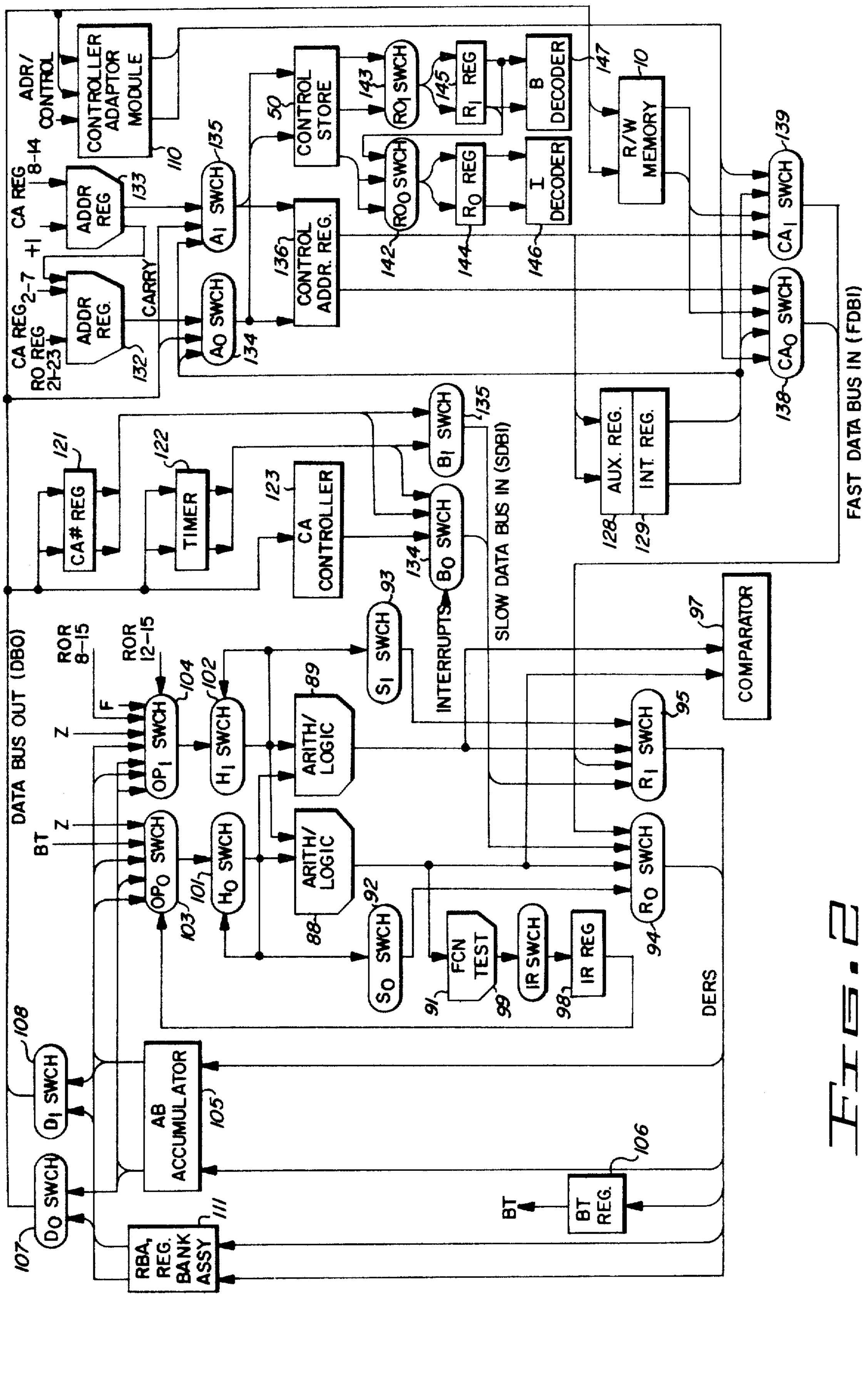
FIG. 2 is a block diagram showing the peripheral controller in greater detail.

The primary data paths for the microprogrammable controller portion of FIG. 1 are shown in greater detail in FIG. 2. In order to minimize costs, it is preferable to use standard logic modules. Unless otherwise indicated, the registers are implemented with J-K flip-flops and the switches are 1 of n select switches, where $n$ = 2, 4 or 8, according to the number of switch inputs. In FIG. 2, a pair of redundant arithmetic/logic units 88 and 89 enable either error detection by comparator 97 for functions of a pair of byte operands or as a transfer path for a word transfer operation. The operands are selected by $OP_0$ and $OP_1$ switches 103 and 104. $H_0$ and $H_1$ switches 101 and 103 are interposed between the OP switches and the arithmetic/logic units in order to insure proper inputs to the adder/logic units when the outputs are stored in one of the operand registers, a byte in the register bank assembly 111. In addition to the adder/logic functions, shift left or right by one bit are performed by $S_0$ and $S_1$ switches 92 and 93. The $R_0$ and $R_1$ result switches 94 and 95 provide inputs to the branch test register 106, the register bank assembly 111 and the AB accumulator. The $R_0$ and $R_1$ switches select the adder/logic output or the S switches or one of the data busses, fast-data-bus-in, FDBI, or slow-data-bus-in, SDBI. $D_0$ and $D_1$ switches 107 and 108 selectively connect the AB accumulator or the register bank assembly to the data-bus-out, DBO. A function test generator 91 generates four indicator bits, such as carry and zero, which are selectively applied to either upper or lower half of indicator register 99 through switch 98.

In FIG. 2, the data bus out (DBO) is made available to the controller adaptor module 110, the controller number register 121, the timer 122 and the control register 123. All of these elements, except module 110, are connected to the slow data bus (SDBI) through $B_0$ and $B_1$ switches 124 and 125, and are thereby made available to the FIG. 2 processor portion.

FIG. 2 also shows the primary data paths for the microinstruction processing. Address adders 132 and 133 either increment the current microinstruction address by two for the control store 50 or change the address in accordance with certain branch microinstructions. The resulting address or another address is selected by $A_0$ and $A_1$ switches 134 and 135 and applied to control store 50 and the control store address register 136. Pairs of microinstructions are transferred to the $RO_0$ and $RO_1$ control store output registers 144 and 145 through $RO_0$ and $RO_1$ switches 142 and 143. Alternatively, the $RO_0$ switch transfers the microinstruction from the $RO_1$ register to the $RO_0$ register. The $RO_1$ register can selectively receive the output of the arithmetic/logical output DERS $_{0-16}$ through the $RO_1$ switch. Instructions, other than branch instructions, are decoded by the I general purpose decoder 146 and branch instructions are decoded by the B branch decoder 147. These decoders are responsive to the contents of the $RO_0$ and $RO_1$ registers, respectively. The controller registers AUXAR 128, INTAR 129 and ROSAR 136, together with the inputs from the controller adaptor module and the read/write memory data are made available to the processing structure over the fast data bus in (FDBI) through $CA_0$ and $CA_1$ switches 138 and 139.

The AI adaptor interface for the controller adaptor 110 is comprised of common sets of lines for data-in, data-out, address/control, status and miscellaneous control. In addition to these lines, the AI includes for each adaptor, lines for an interrupt, adaptor selection, event notification, and a raw clock. Both the data-in and data-out line sets are sixteen bits wide, primarily to support two byte wide data transfer so as to enable doubling the data transfer rate over a single byte transmission. The adress/control lines direct a command to the adaptor in order to change the condition of the adaptor or to define the nature of a concurrent data transfer. The status lines convey information on the condition of the adaptor to the processing unit. The miscellaneous control lines perform functions such as data strobe, response-in (RPI) and initialize. These connections, not including parity, are listed as follows:

| DAI Connections | No. of Lines | To/From Adaptor |
|---|---|---|
| data-out | 16 | to |
| data-in | 16 | from |
| address/control | 8 | to |
| status | 4 | from |
| raw clock | 1 | to |
| interrupt | 1 per adaptor | from |
| event notification | 1 per adaptor | from |
| select | 1 per adaptor | to |
| response in (RPI) | 1 per adaptor | from |
| initialize | 1 per adaptor | to |
| control reset | 1 per adaptor | to |
| operational out | 1 per adaptor | to |
| operational in | 1 per adaptor | from |
| execution clock | 1 per adaptor | to |

The processing repertory shown in FIGS. 3*a* and 3*b* consists of microinstructions which are sixteen bits long and are fetched from control store 50 in pairs or from main memory 10 by a routine in control store. Branch microinstructions are located in odd numbered locations only and each is normally executed in parallel with the even numbered microinstruction paired with it. For most arithmetic, logical and shift microinstructions, the four indicator bits are set, selectively, in either the upper or lower indicator register halves, in accordance with the result produced by the function generator during microinstruction execution. For arithmetic operations, starting with the most significant indicator bit, the indicators are: most significant bit of the result (MSB), overflow (OFL), zero result (Z), and carry-out (C). For logical operations, the indicators are set as: most significant bit (MSB), all ones (FF), zero (Z), and least significant bit (ODD). For the shift microinstructions, the indicators are: the value of the bit shifted out (X), new parity of the even register (P-E), new parity of the odd register (P-O), and active RBA pointer (RBA).

Hence:

| Bit No. | Arithmetic | Logical | Shift |
|---|---|---|---|
| 0 | MSB | MSB | X |
| 1 | OFL | FF | RBA |
| 2 | Z | Z | P-E |
| 3 | C | ODD | P-O |

The formats of the microinstruction vary substantially, as illustrated in FIGS. *3a* and *3b*. The first four bits represent at least the general type of operation specified and therefore determine the remaining field format definitions.

General basic operations including arithmetic, logical, and register to register operations are specified by microinstructions having 0010 in the first four bit positions and have the following format for the remaining bits:

Bits 4–7: general register No. (operand)
Bit 8: accumulator/Rn receives function network output
Bit 9: B/A for operand
Bit 10: result stored in BT reg.
Bit 11: upper/lower indicator reg. set
Bits 12–15: operation type The above format and those below use the following conventions. Where a single bit selects one of two effects, the two effects are separated by a slash, the first effect being selected by a 0. For example, if bit 9 is a 0, the B register is an operand and if bit 9 is a 1 the A register is an operand. A single entry for a single bit length field indicates the result if the value is a 1 and implies that there is no effect otherwise. For example, the function network output is stored in the branch test register if and only if bit 10 is a 1. Bits 12–15 specify the particular operation as follows:

| | | |
|---|---|---|
| 0000 | load/store accumulator register from/to a general register (logical IRs) | |
| 0011 | subtract | |
| 0100 | exclusive OR | |
| 0101 | AND | |
| 0111 | add | |
| 1000 | add carry | |
| 1001 | subtract carry | |
| 1010 | complement (1's) general register | (logical IRs) |
| 1011 | negate general register | |
| 1101 | store indicators from general register | (ignore) |
| 1100 | load indicators from general register | (ignore) |
| 1110 | load branch test register from general register (logical IRs) | |
| 1111 | store branch test register in general register (logical IRs) | |

(Unless otherwise indicated, the indicators generated by the function network for storing in the indicator registers (IRs) are the arithmetic indicators, MSB, OFL, Z, C.) For these general operations, bits 4–7, specify a general register by number as an operand and/or the location which receives the function network output (except for the add and subtract carry operation, if the accumulator is specified as the operand).

Bit 9 specifies which half of the accumulator is another operand, a 1 specifying the A register. Bit 8 specifies which operand location receives the output of the function network, a 0 specifying the accumulator.

Bit 10, if a 1, specifies that the output of the function network is also stored in the branch test register.

Bit 11 specifies which portion of the indicator register receives the indicators from the function generator, a 1 specifying the lower order half.

Special basic operations are denoted by 0011 in the first four bits of the microinstruction. These are the same as the general basic operations except that when bit 11 is a 1, the store function is inhibited, or when bit 11 is a 0, the operation is executed in a propagate mode. When the store function is inhibited, only the indicator register is changed, except that the output of the function network is stored in the branch test register, if bit 10 is a 1. In the propagate mode, the upper carry indicator is an additional input to the function network for add, subtract and negate and the new zero indicator is ANDed with the prior zero indicator.

The primary effect of a basic operation is to store into a specified register the output of the function network. This output is a function of the selected operands, the type of function being selected by the last four bits. (However, the storing of the function network output in the specified register can be inhibited by 1s in bits 3 and 11). The second effect is to store the indicators generated by the function generator in the selected indicator register (except for microinstructions which load or store the indicator registers). A third effect, which is optional, is to store the output of the function network in the branch test register. For binary functions, the first operand is a general register (or optionally an accumulator register if the second operand is a carry), the second operand is one of the accumulator registers or the carry indicator. The register into which the function network output is stored is either one of the selected operand registers (except for the add and subtract carry microinstructions).

The immediate microinstructions are characterized by a 1 in the first bit. The only microinstructions with an initial 1 other than the immediate microinstructions are those for starting a main memory cycle and an adaptor interface service. The latter are distinguished by 000 or 11X in bits 1–3, respectively.

The load immediate microinstruction is specified by bits 0–2 containing 101. Bits 8–15 contain the literal operand constant which is loaded and bits 3–7 designate the register which receives the operand. If bit 3 is a 1, an RBA register is designated and the specific register selected is specified by the binary value of bits 4–7. If bit 3 is a 0, then a 1 in respective bits 4–7 designate the branch test register, the indicator register, the B accumulator, and the A accumulator, in that order.

The remaining immediate microinstructions are defined in bits 0-3 as follows:

| | |
|---|---|
| 1100 | add/subtract literal |
| 1101 | OR literal |

1001 AND literal

The literal operand is contained in bits 12-15. Bit 11 designates which half of the indicator register receives the indicators, and bit 10 determines whether or not the branch test register receives the result of the function network. Accordingly, bits 10 and 11 perform the same functions as in the basic operations. Bits 4–8 designate a register for a second operand in a manner similar to the register selection of the load immediate microinstruction, except that it is bit 8 being a 1 which results in bits 4–7 designating an RBA register.

For the add/subtract immediate microinstruction, bit 9 specifies add if 0 and specifies subtract if 1. These arithmetic operations are performed on the lower order half of the designated register. For the logical immediate microinstructions, bit 9 specifies which half of the designated register is operated upon, with the value 1 specifying the upper order.

The data transfer microinstructions involve word transfer operations, generally for two bytes, including transfers to and from the main memory data register, word transfers between the general registers and the accumulator, and shifts of one and eight bits, as specified by bits 12–15. The data transfer microinstructions have a 0001 in bits 0–3. The operation codes, bits 12–15, are defined (for those having a definition) as follows:

| | |
|---|---|
| 0000 | read main memory data register (MDR) |
| 0001 | write main memory data register (MDR) |
| 0010 | load accumulator (AB) from general register Rn |
| 0011 | store accumulator (AB) into general register Rn |
| 0100 | store ROSAR into AB or Rn, Rn + 1 |
| 0101 | store AUXAR into AB or Rn, Rn + 1 |
| 0110 | store INTAR, interrupt address register, into AB or Rn, Rn + 1 |
| 1000 | shift by 1, logical (zero fill) |
| 1001 | shift by 1, rotate |
| 1010 | shift by 1, arithmetic |
| 1011 | shift by 1, logical (indicator fill) |
| 1100 | shift by 8 |
| 111X | interrupt mechanism |
| 1101 | interrupt mechanism |

The read memory data register and a write memory data register microinstructions, in conjunction with the start read or write memory cycle microinstructions, serve to load/store data from/to main memory. With the read memory data register microinstruction, a 0 in bit 8 indicates that the contents of bits 4–7 select the register, other than the general registers, into which data is loaded. Otherwise, for both microinstructions, bits 4–7 designate a general register. For the read memory data register operations, a 1 in bit 10 causes the more significant data byte to be loaded into the branch test register and a 1 in bit 11 restricts the transfer to a single byte. For a single byte transfer, the more or significant half of the data word is loaded, depending upon the designated register being even or odd, respectively, or A or B, respectively. When the general registers are loaded with data, bit 8 = 1, a 1 in bit 9 causes the accumulator to be loaded also. When a general register is not loaded, bit 8 = 0, a 1 in bit 9 selects the A register for a byte transfer (otherwise, the B register is loaded). With 00010 in bits 4–8, the data is loaded into the less significant word of the control store output register and bits 9–11 are zero. Similarly, for the write memory data register operation, a 0 in bit 8 causes the accumulator to be stored in the memory data register (otherwise a general register pair is stored). With a 1 in bit 9, the designated general register is incremented by 1, for general register stores, and the accumulator is also stored into the general register designated by bits 4–7, for accumulator stores.

For the four shift by 1 operations, a 0 in bit 9 indicates an accumulator shift, otherwise the general register designated in bits 4–7 is shifted. A 1 in bit 11 indicates a single byte shift, otherwise a word shift is performed. For a byte shift of the accumulator, bit 9 selects the A register with a 1 and the B register with a 0. Bit 10 selects the direction of the shift with a 0 for a right shift and a 1 for a left shift. For shift by 1 operations, only the most or least significant bits of the word shifted are stored in the indicators, and only the lower indicator register is used.

With a shift by 8 operation, a 0 in bit 8 indicates that the accumulator is the operand to be shifted, otherwise a designated general register pair is the operand shifted by eight bits. A 0 in bit 11 specifies a rotation operation, otherwise a logical shift is performed with zero fill. For a shift, bit 9 selects the direction with a 0 for a right shift and a 1 for a left shift. For rotations, a 1 in bit 10 specifies that one of the operand's rotated bytes will be stored in both the accumulator and a general register. In this case, bit 9 selects the more significant rotated byte with a 1 and the less significant byte with a 0.

Word load and store operations are specified by having bit combinations 0010–0110, and operands are selected as follows:

| | |
|---|---|
| 0010 | general register |
| 0011 | accumulator |
| 0100 | control store address register (ROSAR) |
| 0101 | auxiliary control store address register (AUXAR) |

For the load accumulator operation, 0010, a 1 in bit 10 causes the parity bit to be complemented. For the store accumulator operation, 0011, the accumulator is stored in the general register designated by bits 4–7, and a 1 in bit 10 causes the A register to be also stored in the branch test register. For the remaining store operations, a 1 in bit 8 specifies that the operand is stored in the accumulator, otherwise it is stored in a general register pair designated by bits 4–7. The interrupt mechanism operations, having 11XX in bits 12–15, provide a variety of special control functions in accordance with the bit combinations of bits 4–7 and 11.

The start memory cycle microinstructions have 1000 in bits 0–3. A 1 in the last bit 15 specifies a write cycle and a 1 in the next to last bit specifies a read cycle. For a write cycle, bits 12 and 13 respectively specify with 1's that the high and low order bytes of the data word are stored. A 0 in bit 8 specifies that the memory address for the cycle is in the accumulator, otherwise the address is taken from the designated general register pair. A 1 in bit 9 specifies that the designated general register is incremented by one if that register is specified as holding the data address or specifies that the accumulator is saved in the designated general register if the accumulator is specified as holding the data address.

The adaptor interface service microinstruction has the bit combination 111 in bit positions 0–2.

A 1 in bit 3 specifies that a link adaptor port is selected, otherwise the transfer is over a controller adaptor port. A 0 in bit 4 specifies that microinstruction execution is delayed until a signal is received on the response-in line. A 1 in bit 5 specifies that the DAI status is gated into the low order half of the branch test register. If bit 7 is 1, the high order byte of the data-in lines is loaded into the A accumulator register. If bit 6 is a 1, the register B is loaded with the low order byte. Bits 8–15 contain a byte literal for setting the DAI address-/control lines.

The conditional branch microinstruction has 01 in bits 16 and 17. A branch is taken to the segment address specified by a literal in bits 24–30, if and only if the bit tested equals the value of bit 19. Only branches to even locations are allowed so that the last bit 31 is ignored for branch address preparation purposes. However, this last bit is used to select the upper or lower half of the register containing the bit to be tested. The register to be tested is specified by bits 22 and 23 as follows:

| | |
|---|---|
| 00 | indicator registers |
| 01 | branch test register |
| 10 | A register |
| 11 | B register |

Bits 20 and 21 specify the bit to be tested within the specified half register by the binary number represented. A 1 in bit 18 indicates that the even microinstruction preceding the conditional branch is executed and completed before the branch microinstruction is started.

A segment branch microinstruction has all zeros in bits 16–19. If bit 20 is a 0, an unconditional branch is made to the address specified by the rest of the microinstruction. However, the last bit is ignored for address preparation purposes. If it is a 1, the contents of ROSAR are safe-stored in AUXAR. Bits 21–23 are treated as a 2's complement number specifying the desired relative 256 word segment and bits 24–30 specify the desired word within that segment.

If bits 20 and 21 are 11, a branch is made to the address prepared by substituting bits 24–30 for the last half of the present instruction address and appending the contents of the portion of the branch test register (BTR) specified by bits 22, 23 and 31. (BTR' indicates the non-current branch test register is used.)

| | |
|---|---|
| 00 ··· 0 | $BTR_{0-1}$ |
| 00 ··· 1 | $BTR'_{0-1}$ |
| 01 ··· 0 | $BTR_{2-3}$ |
| 01 ··· 1 | $BTR'_{2-3}$ |
| 10 ··· 0 | $BTR_{6-7}$ |
| 10 ··· 1 | $BTR_{0-3}$ |
| 11 ··· 0 | $BTR_{4-7}$ |

If bits 20–23 contain 10X0 in the branch microinstruction, a branch is made to the address contained in AUXAR or the accumulator, in accordance with the first bit of bit 22 being a 1 or 0, respectively. If bit 22 is 1, the current interrupt level is reset. If bit 31 is a 1, the contents of ROSAR are stored in AUXAR.

If bits 20–23 contain 10X1, a branch is made to the address formed as follows. The low order portion is taken from bits 24–30. The high order bits 2–7 are taken from the A register or ROSAR in accordance with the bit 22 being 0 or 1 respectively. If the last bit 31 is a 1, the contents of ROSAR are stored in AUXAR.

A NOP microinstruction in an even location has all zeros. In an odd location, bits 24–30 contain the low order half of the address of the next location.

In the preferred embodiment, standard TTL integrated circuits are used to implement the invention because they presently provide the best cost-performance characteristics. The control store is a standard set of random access memory integrated circuits with decoders and drivers. The control store is modular, so that the subsystem can be made to fit the needs of the application. Modules are conveniently 512 words in size. Because the potential addressing range of the processor's sixteen bit word is 64K words, much larger than necessary, and because only even addresses are used, those registers which are exclusively dedicated to control store addresses can be truncated in accordance with the upper limit of expected control store memories and the least significant bit deleted. Accordingly, registers 128, 129 and 136 are limited to 13 bits, which allows addressing of 8K even words or 16K words in total.

Figure 4:
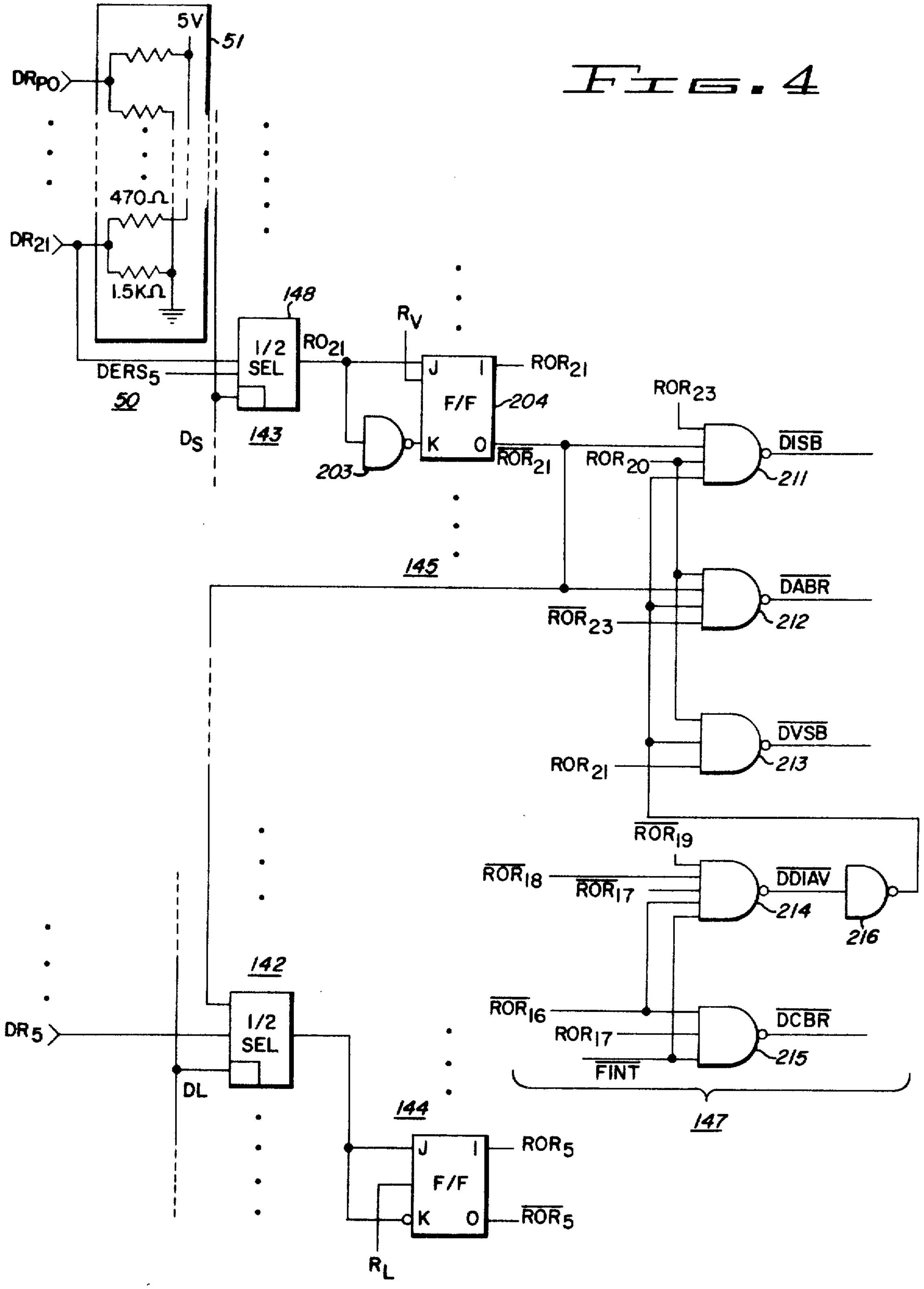
FIG. 4 shows the implementation of the control store output register and the branch microinstruction decode which supply signals for FIGS. 5–7.

FIG. 4 shows in partial detail how the microinstructions are decoded. In the control store 50, the stack outputs, $DR_0$– $DR_{31}$, are conveniently terminated with open collectors tied to ground through a 1.5 Kohm resistor and tied to a five volt supply through a 470 ohm resistor. Three, twelve input, integrated circuit packages, such as package 51, receive a pair of microinstructions plus four parity bits. $DR_0$–$DR_{31}$ provide inputs to switches 142 and 143 which are implemented with quad one of two selector switches, such as selector 148. For example, for switch output $RO_{21}$, either the control store output $DR_{21}$ or the function network bus $DERS_5$ is selected, where the second option enables loading a microinstruction into the microinstruction output register 145 from main memory 10.

The odd microinstruction switches 143 select either the function network output DERS $_{0-15}$ or the control store output as selected by $D_S$. Similarly, the even microinstruction switches 142 select either the odd microinstruction output register or the control store output $ROR_{0-15}$, as selected by $D_L$. All of the odd selector outputs are connected to a set of J-K flip-flops, e.g., 204, which constitute the output register 145. The output register 144 is similarly implemented. For flip-flop 204, the J input is complemented for the K input and $R_V$ gates the flip-flops. The output register signals $ROR_{0-31}$ are used for many functions.

One such function is the branch decoder 147. A conditional branch is decoded by NAND gate 215:

$$\overline{DCBR} = \overline{\overline{ROR_{16}} \cdot ROR_{17} \cdot \overline{FINT}}$$

All other branch microinstructions are decoded by gate 214:

$$\overline{DDIAV} = \overline{\overline{ROR_{16}} \cdot \overline{ROR_{17}} \cdot \overline{ROR_{18}} \cdot \overline{ROR_{19}} \cdot \overline{FINT}}$$

A vector segment branch is decoded by gate 213:

$$\overline{DVSB} = \overline{ROR_{20} \cdot ROR_{21} \cdot DDIAV}$$

An absolute branch is decoded by gate 212:

$$\overline{DABR} = \overline{ROR_{20} \cdot \overline{ROR_{21}} \cdot \overline{ROR_{23}} \cdot DDIAV}$$

An indirect segment branch is decoded by gate 211:

$$\overline{DISB} = \overline{ROR_{20} \cdot \overline{ROR_{21}} \cdot ROR_{23} \cdot DDIAV}$$

Figure 5:
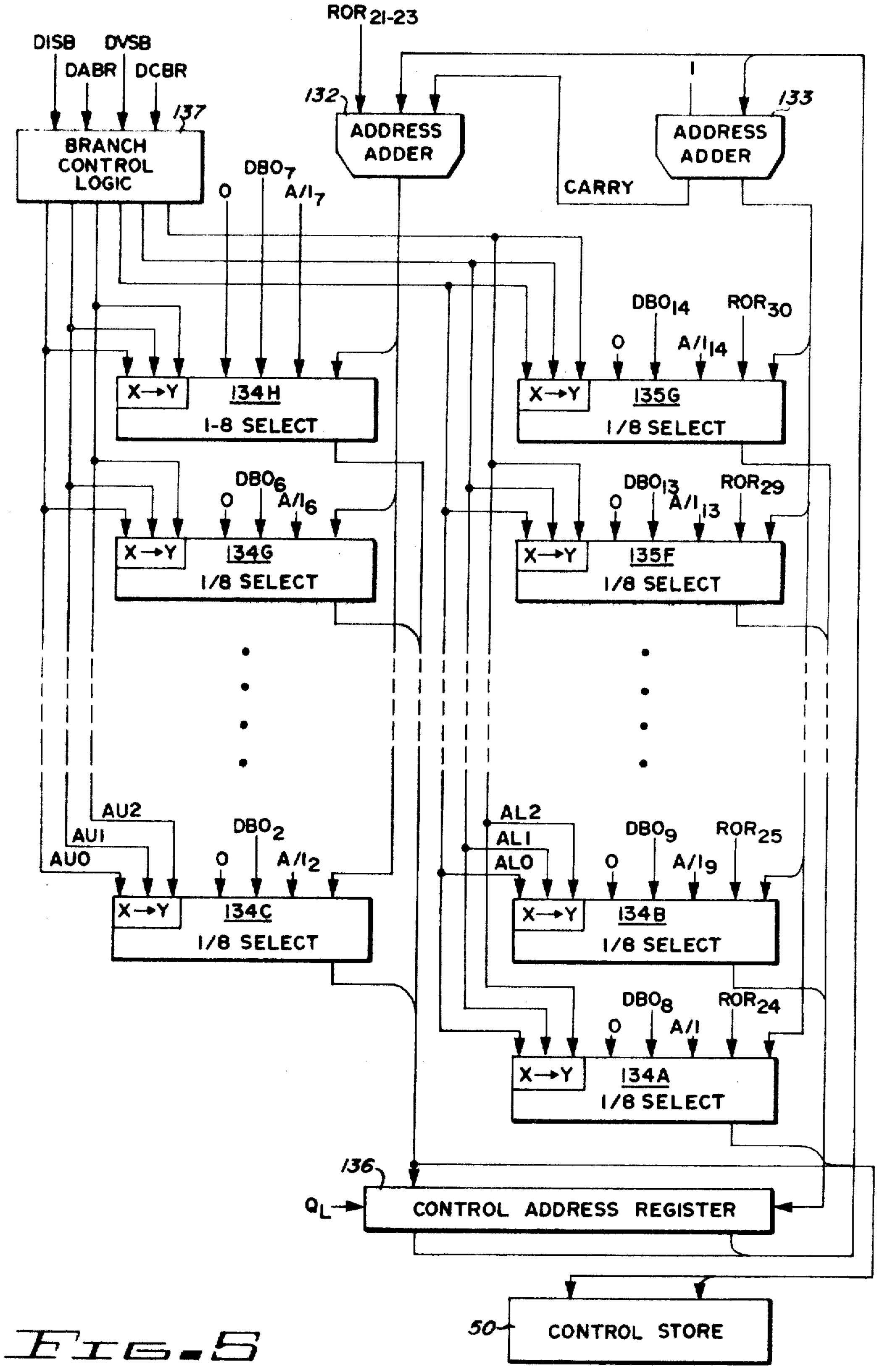
FIG. 5 shows the address formation implementation.

When a branch instruction is decoded, a branch address is prepared and directed to the control store 50 for fetching the instruction and the address is stored in the control address register 136. FIG. 5 shows how this address preparation is implemented. The one of eight selectors, 134C-H and 135A-G provide the respective bits for the address. For example, if an absolute branch is performed and the contents of bits 22–25 are OX11, the contents of the auxiliary register are selected for the fetch of the next microinstruction pair while the preceding even microinstruction is being executed.

For branch microinstructions, such as a conditional branch where the condition is met, the address is modified by the low order bits, $ROR_{24-30}$, from the control store output register 145. The high order bits are taken from the control store address register 136 through address adder 132 and $A_0$ switch selectors 134C-H. The second operand for address adder 132 is the constant zero. For the direct segment branch, address preparation is similar except that the second operand for address adder 132 is $ROR_{21-23}$ with the sign extended to the left. The selector lines for the one of eight selectors 134C-H are derived as follows:

$$AUO = DISB \cdot \overline{ROR_{22}}$$

$$AU1 = DABR \cdot \overline{ROR_{25}}$$

$$AU2 = WMD \cdot D_L$$

The selector lines for the one of eight selectors 135A-G are derived as follows:

$$AL0 = FINT \cdot DABR \cdot (\overline{ROR_{24}} + ROR_{25}) + DVSB$$

$$AL1 = DABR \cdot \overline{ROR_{25}}$$

$$AL2 = DVSB + DDISB$$

The address in control store is clocked by $Q_L$ where:

$$Q_L = QEXEC \cdot D_L$$

Figure 6:
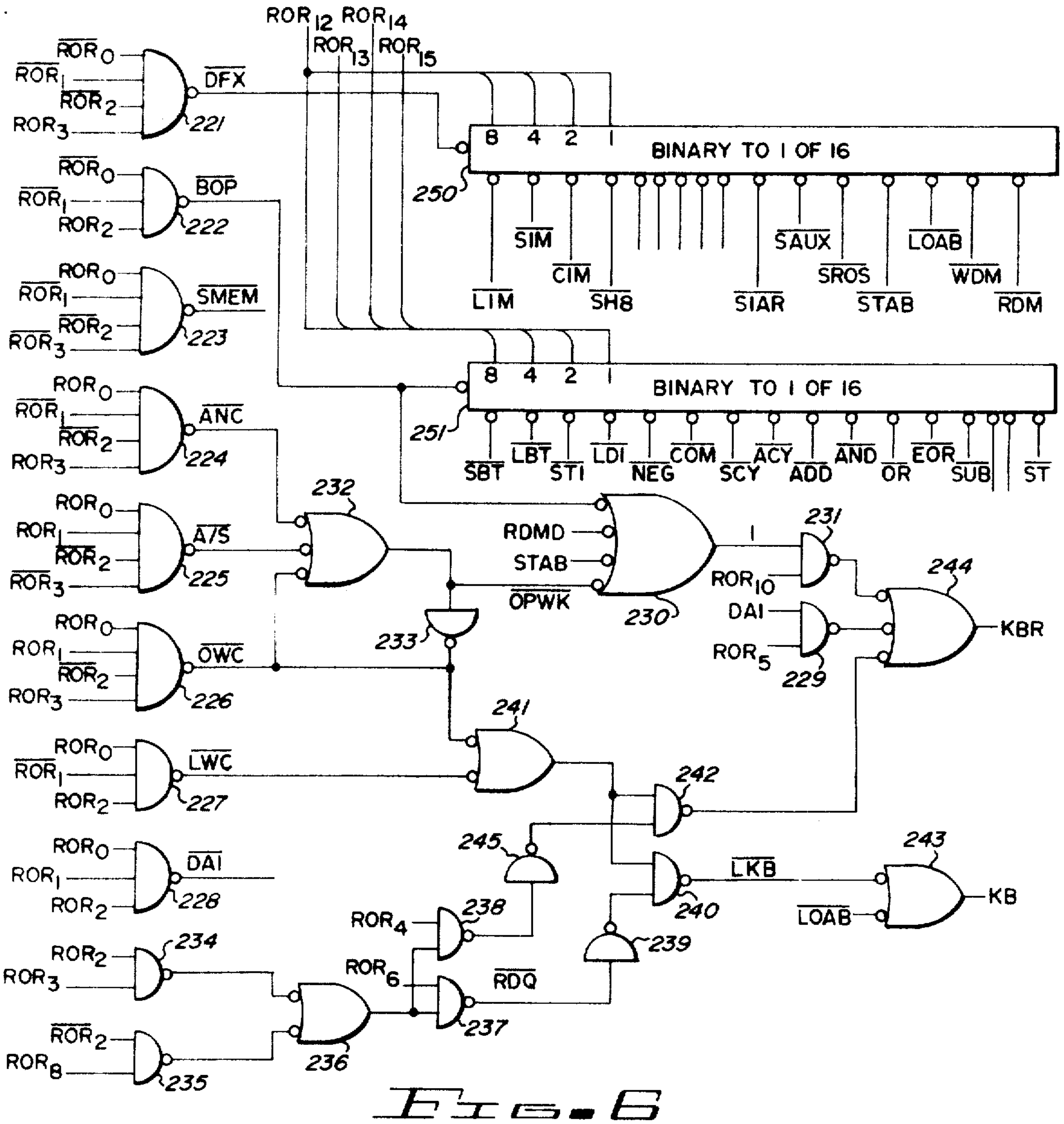
FIG. 6 shows the primary microinstruction decode implementation and the derivation of representative control signals in response to the high order of the control store output register.

The general purpose microinstruction decoder 146 is shown in FIG. 6. NAND gate 221 decodes a data transfer:

$$DFX = \overline{\overline{ROR_0} \cdot \overline{ROR_1} \cdot \overline{ROR_2} \cdot ROR_3}$$

Gate 222 decodes a basic operation:

$$\overline{BOP} = \overline{\overline{ROR_0} \cdot \overline{ROR_1} \cdot ROR_2}$$

Gate 223 decodes a memory cycle:

$$\overline{SMEM} = \overline{ROR_0 \cdot \overline{ROR_1} \cdot \overline{ROR_2} \cdot \overline{ROR_3}}$$

Gate 224 decodes an AND literal operation:

$$\overline{ANC} = \overline{ROR_0 \cdot \overline{ROR_1} \cdot \overline{ROR_2} \cdot ROR_3}$$

Gate 225 decodes an add or subtract literal operation:

$$\overline{A/S} = \overline{ROR_0 \cdot ROR_1 \cdot \overline{ROR_2} \cdot \overline{ROR_3}}$$

Gate 226 decodes an OR with literal operation:

$$\overline{OWC} = \overline{ROR_0 \cdot ROR_1 \cdot \overline{ROR_2} \cdot ROR_3}$$

Gate 227 decodes a load literal operation:

$$\overline{LWC} = \overline{ROR_0 \cdot \overline{ROR_1} \cdot ROR_2}$$

Gate 228 decodes an adaptor interface service operation:

$$\overline{DAI} = \overline{\overline{ROR_0} \cdot \overline{ROR_1} \cdot ROR_2}$$

The type of basic operation is decoded by a binary to one of 16 line selector unit 251. Similarly, the type of data transfer operation is decoded by a binary to one of 16 line selector 250. The derivation of the clock control signal KB for selecting the B register to receive the output of the function network is shown. Gate 243 generates KB from LKB, by effectively ORing LKB and LOAB from the binary to one of 16 selector 250. LKB is derived from all the immediate type operation decodes and additional decoding by gates 232–243:

$\overline{LKB} = \overline{(ANC + A/S + OWC + LWC) \cdot (ROR_6 \cdot [ROR_2 \cdot \overline{ROR_3} + \overline{ROR_2} \cdot \overline{ROR_8}])}$ Additional inputs to KB gate 243 are $\overline{LKB_1}$, $\overline{LKB_2}$, $\overline{LKB_3}$, $\overline{LKB_4}$ and $\overline{LKB_5}$:

$\overline{LKB_1} = \overline{BOP \cdot \overline{ROR_3} \cdot \overline{ROR_{11}} \cdot \overline{BOP} \cdot (ROR_8 + ROR_9) \cdot (ROR_{12} \cdot \overline{ROR_{13}}) + ST + \overline{ACY} + \overline{SCY} + SUB}$ $\overline{LKB_2} = \overline{(ANC + A/S + OWC) \cdot ROR_6 \cdot (ROR_2 \cdot ROR_3 + \overline{ROR_2} \cdot ROR_8)}$ $$\overline{LKB_3} = \overline{\overline{ROR_9} \cdot ROR_{12} \cdot \overline{ROR_{13}}}$$

$\overline{LKB_4} = \overline{(ROR_0 \cdot ROR_1 \cdot ROR_2 \cdot \overline{ROR_6})\ SIM + ROR_8 + SAUX \cdot SROS \cdot SIAR}$ $\overline{LKB_5} = \overline{RDMD \cdot (ROR_8 \cdot ROR_9 + \overline{ROR_7} \cdot \overline{ROR_8} \cdot \overline{ROR_9}) + SH8 \cdot (\overline{ROR_9} + ROR_8 \cdot \overline{ROR_9} \cdot ROR_{10})}$ Similarly, a clock control signal KBR for the branch test register is generated by gates 229–232 and 244: $KBR = DAI \cdot ROR_8 + (BOP + ANC + A/S + OWC + STAB + RDMD) \cdot ROR_{10} + LBT + (ANC + A/S + OWC + LWC) \cdot ROR_4 \cdot (ROR_2 \cdot ROR_3 + \overline{ROR_2} \cdot ROR_8)$ Similarly, clock control signals are generated for the general registers (even and odd), the A and B registers of the accumulator and the indicator register in accordance with the repertory constraints using conventional logic as in FIG. 6. Also, the control signals for the arithmetic and logic units are derived in a similar manner. For the X adder, a first common signal $\overline{ADDA1}$ is derived:

$SXA = \overline{ROR_8} \cdot ROR_9 \cdot WRMD + ROR_8 \cdot ROR_9 \cdot SMEM + STAB$ $\overline{ADDA1} = \overline{LOAB + SBT + STI + SH8 + LDI + STA + SXA}$ Second and third partially common signals $\overline{ADDC_0}$ and $\overline{ADDC_1}$ are: $\overline{ADDC_0} = \overline{ANC + AND + ADD + A/S \cdot \overline{ROR_9} + ACY + ROR_8 \cdot ROR_9 \cdot SMEM}$ $\overline{ADDC_1} = \overline{EOR + OWC + OR + SUB + ROR_9 \cdot A/S + NEG + SCY}$ A fourth partially common signal is SXB1:

$\overline{SXB1} = \overline{LWC + LBT + \overline{ROR_8} \cdot ST + ROR_8 \cdot \overline{ROR_9} \cdot ST}$ The respective adder inputs are:

$SXADD_0 = ADDA1 + ADDC_0 + COM$ $SXADD_1 = ADDA1 + SXB1 + ANC + AND + ADDC_0$ $SYADD_2 = ADDA1 + COM + ADDC_1$ $SXADD_3 = ADDA1 + SXB1 + OR + OWC$ The Y adder control signals are derived similarly:

$DA = ROR_8 \cdot ROR_9 \cdot ST + STA + LDI + STI + SBT$ $SYADD_0 = DA + COM + ADDC_0$.

$DB = LOAB + SH8 + SXA + SXB1$ $SYADD_1 = DB + DA + ADDC_1 + ANC + ADD$ $SYADD_2 = DA + ADDC_1 + COM_1$ $SYADD_3 = DA + DB + ADDC_0 + OR + OWC$

A first control signal for the XOP switch is:

$DXOP_0 = (ANC + A/S + OWC)[ROR_4 + ROR_6)(ROR_2 \cdot ROR_3 + \overline{ROR_2} \cdot ROR_8) + ROR_8] + SMEM \cdot ROR_9 + (SH8 \cdot [\overline{ROR_9} \cdot ROR_{11} + \overline{ROR_8}] + SH1 \cdot ROR_8 + LOAB) \cdot DXF + (NEG + SBT + [ACY + SCY] \cdot [^{ROR}{}_8 \cdot \overline{ROR_9}\ 30\ ROR_7 \cdot ROR_8] + [AND + OR + EOR + ADD + SUB] \cdot \overline{ROR_9} + LDI \cdot ROR_7)\ BOP$ This signal is determined by the architecture and repertory of instructions. The remaining operand select controls are of the same form and are derived from the repertory of instructions in the same manner.

Figure 7:
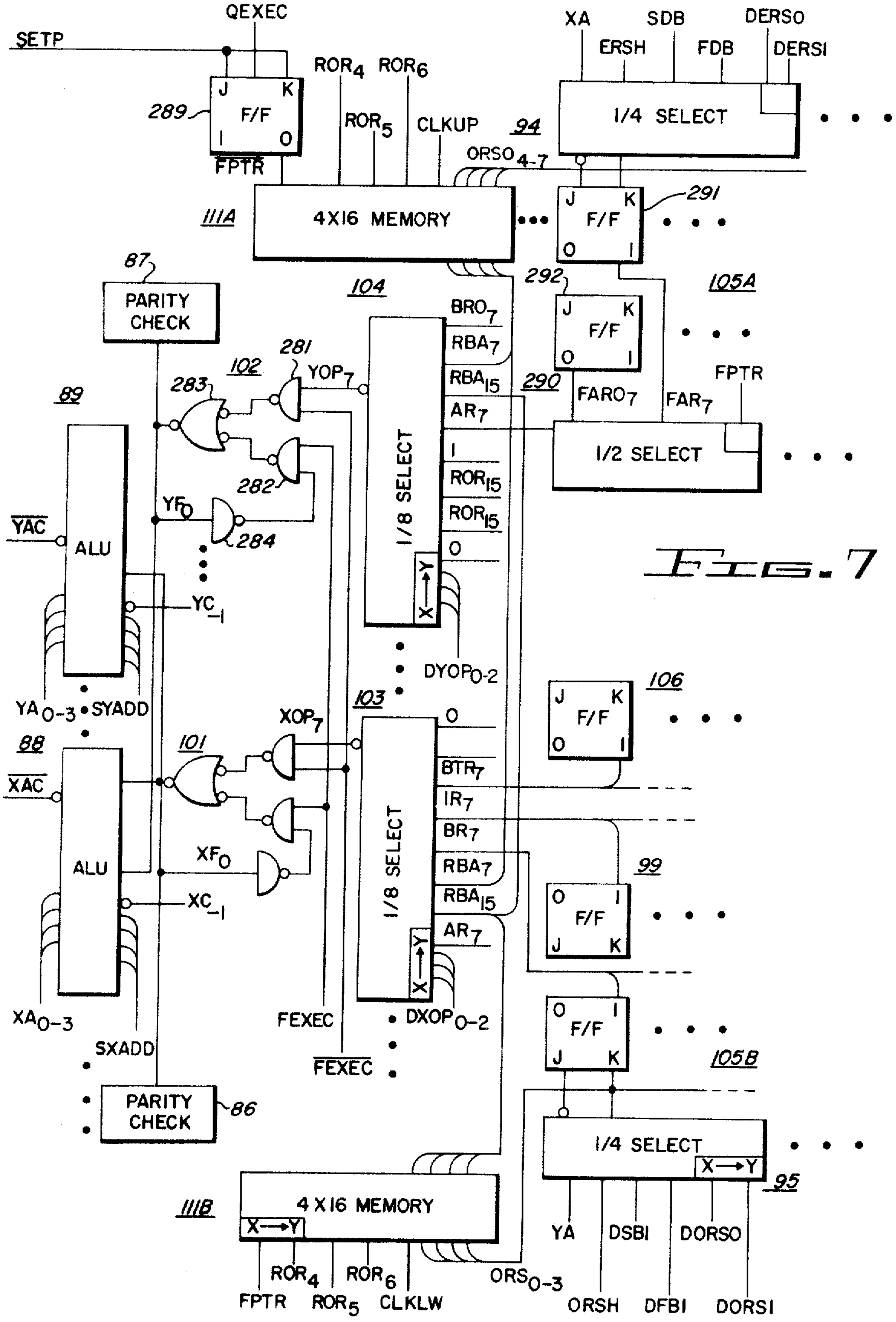
FIG. 7 shows the implementation of the arithmetic and logic portion of the controller.

The relationship between the various registers and the arithmetic and logic units is shown in greater detail in FIG. 7. The arithmetic and logic units 88 and 89 are each conveniently a pair of four bit arithmetic and logic units, one of each unit being shown. The units respectively generate output functions $XA_{0-7}$ and $YA_{0-7}$ in accordance with the respective function select lines SXADD and SYADD. Both units receive operands $XF_{0-7}$ and $YF_{0-7}$ from respective freeze-up switches 101 and 102. During the $\overline{EXEC}$ pulse, gate 281 gates the operand bit $YOP_0$ to the arithmetic and logic units through gate 283, which inverts the operand bit. Gate 282 has no effect during the $\overline{EXEC}$ pulse because it receives EXEC as one of its inputs. At the termination of the $\overline{EXEC}$ pulse, the hold-up switch 102 maintains the operand bit value because of the feedback inverter 284 and gates 282 and 283. All of the operand bits are maintained in this manner so that the same register can both provide an operand and receive the output of the function network, that is, the output of $R_0$ and $R_1$ switches 94 and 95. The gates for switch 101 operate in the same manner as gates 281–284 but for the XOP operand bits.

The X and Y operands are provided by the XOP and YOP select switches 103 and 104. For each operand, the control signals $DXOP_{0-3}$ and $DYOP_{0-3}$ select one of eight input bits. Both switches receive inputs from the A and B sections of the accumulator and the 111A and 111B even and odd byte portions of the general registers. The respective even and odd byte portions of the general accumulator are each a set of 4×16 scratch pad memory elements, two elements for information and a third for parity. The selection of four bit portions of the memory elements is by signals $ROR_{4-6}$, FPTR and CLKUP or CLKLW. $ROR_{4-6}$ are derived from decoding the microinstruction and $ROR_7$ determines the even or odd byte general registers, that is, CLKUP and CLKLW. FPTR is generated by flip-flop 289 and determines which set of working registers in in use.

The inputs to the registers are $ERS_{0-7}$ and $ORS_{0-7}$ for the even and odd portions respectively. These signals are taken from sets of one of four select elements 94 and 95, the outputs of which are considered the function network outputs. The inputs for select elements 94 are taken from the arithmetic and logic unit 88, $S_0$ switch 92, slow data bus SDBI and fast data bus FDBI. The output of select elements 94 are directed to several elements including the A accumulator register 105A and the even general register 111A. The A accumulator register 105A has a set of high level flip-flops, the first of which is 291, and a set of low level flip-flops, the first of which is 292. The high or low level set of flip-flops provide the A accumulator register inputs $AR_{0-7}$ to both one of eight select elements 103 and 104 through one of two select elements 290 in accordance with FPTR. The one of four select elements 95 provide function network outputs to the X and Y operand select elements 103 and 104 and memory element 111B in the same manner. For the immediate microinstructions, the control store output register 144 is connected to the selector elements 104. Similarly, the branch test register consisting of J-K flip-flops 106 and the indicator register 99 are connected to select elements 103 in the same manner as the A accumulator register 105A.

Figure 8:
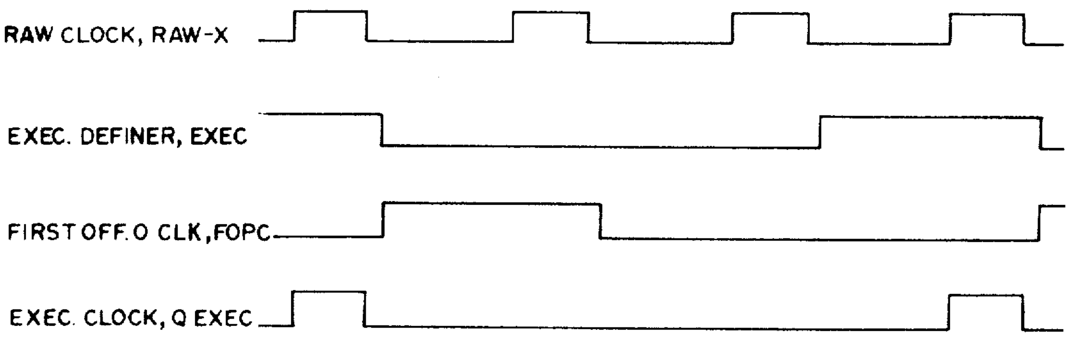
FIG. 8 is a timing diagram illustrating operation of the controller.

The timing relationships are shown in FIG. 8. The basic timing is derived from a clock signal RAW-X having a representative frequency of ten megahertz. From this source, the execution definer EXEC, execution clock QEXEC, and first off phase clock FOPC. In general, the registers are effectively clocked on the trailing edge of the execute pulse.

As shown in FIG. 7 for the A register of the accumulator, the working registers are duplicated. These working registers include the register bank assembly 111 accumulator 105, auxiliary control store address register 128, interrupt address register 129, indicator register 99, control adaptor number register 121, and the branch test register 106. By the use of duplicated working registers, interrupt service can be initiated rapidly and efficiently. When an interrupt signal occurs on the AI adaptor interface lines, the required response is effected primarily by generating FINT, insuring proper setting of the FPTR flip-flop 289 and normally branching on the inputs to switches 134 and 135, while saving the return address in the interrupt address register 129.

It is understood that the invention should not be construed as being limited to the form of embodiment described and shown herein as many modifications may be made by those skilled in the art without departing from the scope of the invention.

What is claimed is:

1. A microprogrammable processor comprising:

A. processor means, including register means, for performing a repertory of arithmetic and logic operations;

B. a microinstruction register, capable of holding a pair of microinstruction words in even and odd portions of said microinstruction register;

C. a control store, connected to said microinstruction register, for providing even/odd pairs of microinstructions in parallel to said even and odd portions;

D. a general purpose microinstruction decoder, responsive to the first word in said microinstruction register, for controlling said processor means;

E. a branch microinstruction decoder, responsive to the second word in said microinstruction register, for enabling braching simultaneously with execution of the first microinstruction word in said microinstruction register;

F. transfer means for selectively transferring said second word to the first word position of said microinstruction register.

2. The microprogrammable processor of claim 1, wherein:

F. said general purpose microinstruction decoder including means to respond to all branch type microinstructions as NOP microinstructions.

3. A microprogrammable processor comprising:

A. a microinstruction register, having a first even portion for storing microinstructions from even locations in a control store, and a second, odd portion for storing microinstructions from odd numbered locations;

B. a control store, connected to said microinstruction register, for providing even/odd pairs of microinstructions in parallel to said even and odd portions;

C. a general purpose microinstruction decoder, connected to said microinstruction register even portion, for determining the operation specified by the microinstruction;

D. a branch microinstruction decoder, connected to said microinstruction odd portion, for detecting a branch operation specified by the odd microinstruction;

E. a control store address register connected to said control store for selecting pairs of microinstructions;

F. address modification means connected to said control store address register and said microinstruction register for modifying the contents of said control store address register in accordance with coding in said microinstruction register odd portion;

G. branch control means, connected to said control store address register, for selectively modifying the contents thereof and gating the addressed microinstruction pair from said control store to said microinstruction register during execution of an even microinstruction following loading of a microinstruction pair into said microinstruction registers, in response to said branch decoder detecting a branch condition in the coding of an odd instruction;

H. processor means, connected to said general microinstruction decoder, and including an accumulator register for performing a repertory of data processing functions in accordance with the contents of said microinstruction even portion;

I. transfer means, interconnecting said even and odd microinstruction register portions and responsive to said branch microinstruction decoder, for selectively transferring the contents of the odd portion to the even portion of said microinstruction register during execution of an even microinstruction when said decoder does not select a branch operation.

4. The microprogrammable processor of claim 6, further comprising:

J. an indicator register, responsive to said processor means, in such a manner that the contents of the indicator register store information representing conditions produced in performing a data processing function, including a zero result indicator;

K. conditional branch control means, connected to said indicator register and said branch control means, for selectively inhibiting the gating of the addressed microinstruction pair to said microinstruction register.

5. The microproagrammable processor of claim 6 wherein:

J. said general purpose microinstruction decoder including means to respond to all branch type microinstructions as NOP microinstructions.

* * * * *